(12) United States Patent
Adams et al.

(10) Patent No.: US 7,695,807 B2
(45) Date of Patent: Apr. 13, 2010

(54) NON-STICK FINISH

(75) Inventors: Jerome T. Adams, Hockessin, DE (US);
Osamu Hayakawa, Shizuoka (JP);
Michael J. Witsch, Norwood, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 469 days.

(21) Appl. No.: 11/726,837

(22) Filed: Mar. 23, 2007

(65) Prior Publication Data

US 2007/0231563 A1    Oct. 4, 2007

Related U.S. Application Data

(60) Provisional application No. 60/789,631, filed on Apr. 4, 2006.

(51) Int. Cl.
*B32B 5/02* (2006.01)
*B32B 27/20* (2006.01)
*B32B 33/00* (2006.01)

(52) U.S. Cl. .................... 428/323; 428/336; 428/411.1; 428/421; 428/473.5

(58) Field of Classification Search .................. None
See application file for complete search history.

(56) References Cited

U.S. PATENT DOCUMENTS

| | | | |
|---|---|---|---|
| 3,928,703 A | * | 12/1975 | Cook ........................ 442/85 |
| 4,014,834 A | | 3/1977 | Concannon |
| 4,380,618 A | | 4/1983 | Khan et al. |
| 5,079,073 A | | 1/1992 | Tannenbaum |
| 5,562,991 A | | 10/1996 | Tannenbaum |
| 6,291,054 B1 | | 9/2001 | Thomas et al. |
| 6,761,964 B2 | | 7/2004 | Tannenbaum |
| 6,863,974 B2 | | 3/2005 | Shah et al. |

FOREIGN PATENT DOCUMENTS

| | | |
|---|---|---|
| CA | 2196255 | 7/1997 |
| DE | 3130496 | 2/1983 |
| EP | 0 724 915 B1 | 1/2001 |
| JP | 64-079269 | 3/1989 |
| WO | WO93/06534 | 4/1993 |

* cited by examiner

*Primary Examiner*—Ramsey Zacharia

(57) ABSTRACT

A non-stick coating on a substrate is provided wherein the coating comprises an overcoat and a primer adhering the overcoat to the substrate, the overcoat comprising fluoropolymer and an effective amount of ceramic particles, preferably at least 3 wt % based on the combined weight of the fluoropolymer and the ceramic particles in the overcoat, said ceramic particles having an average particle size of at least about 10 micrometers to increase the abrasion resistance of said coating as determined by the dry SBAR method.

20 Claims, No Drawings

NON-STICK FINISH

BACKGROUND OF THE INVENTION

1. Field of the Invention

This invention relates to non-stick fluoropolymer finishes exhibiting improved abrasion resistance.

2. Description of Related Art

The technology of forming a non-stick fluoropolymer finish on a substrate, such as aluminum, to form a release surface for such applications as cookware has typically involved the use of at least two coatings on the substrate, an undercoat typically called a primer to adhere to the substrate, and an overcoat to provide the non-stick coating (finish). Because of the non-stick nature of fluoropolymer, the primer is formulated to contain one or more adhesion promoters. Colloidal silica and thermally stable polymer binder (generally fluorine-free) are examples of adhesion promoters, as disclosed in U.S. Pat. No. 5,562,991 to Tannenbaum. The adhesion promoter constitutes a substantial portion of the primer, typically at least 40 wt %, based on the combined weight of fluoropolymer plus adhesion promoter. The surface of the overcoat is rich in, if not entirely, fluoropolymer. The presence of fluoropolymer both in the primer and the overcoat promotes adhesion between these coatings (intercoat adhesion).

It has become known to incorporate relatively large particles of inorganic, non-metallic particles into the primer layer to increase abrasion resistance of the non-stick finish. EP 0 724 915 to Bignami discloses the use of cristobilite, which is a $SiO_2$ mineral having a Moh's hardness of 6.5 (corresponds to a Knoop hardness of 820), in the primer layer. U.S. Pat. Nos. 6,291,054 to Thomas et al. and 6,761,964 to Tannenbaum disclose the use of harder large ceramic particles, preferably having a Knoop hardness of at least 1200, in the primer layer. In Example 1 of '054, a single coat system is disclosed in which the single coat is quite thick (19.5-59.7 micrometers) and the amount of polymer binder exceeds the amount of fluoropolymer. In U.S. Pat. No. 6,863,974 to Shah et al., no fluoropolymer is present in the primer layer, just heat resistant adhesion promoter (polymer binder) along with inert inorganic particles (ceramic particles) having an average particle size of at least 10 micrometers and Moh's hardness of at least 5. Intercoat adhesion to the topcoat is obtained by including adhesion promoter in the fluoropolymer-containing topcoat composition.

While at least the '054 and '942 patents have provided improvement in abrasion resistance on a commercial basis, further improvement in abrasion resistance is desired.

SUMMARY OF THE INVENTION

The present invention provides a non-stick finish on a substrate that exhibits further improvement in abrasion resistance. Thus, the present invention is a substrate having non-stick coating thereon comprising an overcoat and a primer adhering said overcoat to said substrate, said overcoat comprising fluoropolymer and an effective amount of ceramic particles having an average particle size of at least about 10 micrometers to increase the abrasion resistance of said coating as determined by the dry SBAR method.

Preferably, an effective amount of ceramic particles having an average size of at least about 10 micrometers is that which improves the abrasion resistance of the coating on said substrate by at least 10% as determined by the dry SBAR method.

The overcoat is not a primer, i.e. the surface to which the overcoat is applied to form a non-stick finish is not the bare substrate receiving the non-stick finish. Instead, the substrate has a primer layer for adhesion to the substrate, and the primer layer forms the surface on which the fluoropolymer/ceramic particle-containing overcoat is formed. The overcoat cannot function as primer layer because the composition of the overcoat either does not does not contain adhesion promoter or if it does contain adhesion promoter, it is present in such small amount as not to provide commercially useful adhesion to a substrate. Typically, the presence of fluoropolymer in the primer layer is all that is necessary for intercoat adhesion to the non-stick fluoropolymer layer. A small amount of adhesion promoter can be present in the overcoat, however, to promote intercoat adhesion between the primer layer and the overcoat layer, when the primer layer does not contain fluoropolymer as in U.S. Pat. No. 6,863,974.

Thus, the present invention is the combination of an overcoat layer described above applied to a primer-layer-coated substrate. The overcoat layer can serve as the exposed surface of the non-stick finish on the substrate or can serve as a midcoat, on which a topcoat is formed. The topcoat has a greater concentration of fluoropolymer than the midcoat to provide the best non-stick property to the overall finish. Whether the overcoat is a single layer (on a primed substrate) forming the exposed surface of the non-stick coating or is a midcoat layer containing the fluoropolymer and ceramic particles having an average size of at least 10 micrometers, it is preferred that such layer contain at least 3 wt % of the ceramic particles, based on the combined weight of the fluoropolymer and ceramic particles. If adhesion promoter is present in such layer to promote intercoat adhesion between such layer and the primer layer, the amount of adhesion promoter should be no more than 10 wt % of the combined weight of the fluoropolymer and adhesion promoter in the layer. The expression overcoat used herein refers both to the overcoat as a single layer forming the exposed surface of the non-stick finish and to the midcoat in a composite of midcoat and topcoat layers.

Surprisingly, the presence of the ceramic particles in the overcoat provides further improvement in abrasion resistance as will be demonstrated in the Examples. Thus, the non-stick finish (coating) of the present invention provides surprisingly improved abrasion resistance. For example, a small amount of the ceramic particles in the overcoat exhibits greater abrasion resistance than when (a) the primer contains a much greater amount of the same ceramic particles, and (b) the overcoat does not contain any of the ceramic particles. Surprisingly, placing the ceramic particles in the overcoat improves abrasion resistance over just the use of the ceramic particles in the primer layer.

In one aspect of the present invention, the overcoat layer has a thickness of about 0.5 to 1 mil (12.7 to 25.4 micrometers). In another aspect, the overcoat has a thickness that is greater than the minor dimension of said ceramic particles. In still another aspect, the thickness of the overcoat is less than the major dimension of the ceramic particles. From the foregoing aspects, it is apparent that the ceramic particles are typically irregular in shape, similar to gravel or tablets in appearance (viewed under magnification) having a major dimension (length or major axis) and a minor dimension (height or minor axis). Upon application of the overcoat composition from a liquid medium to a primed substrate, followed by drying, the particles tend to lay down within the thickness of the resultant overcoat, whereby only the minor dimension of the particles tend to extend perpendicular from the substrate being coated. This tends to give a good non-stick exposed surface, which aids in the non-stick property of the coating. This midcoat layer can be overcoated with a topcoat of essentially all fluoropolymer to provide even further improvement in release property.

DETAILED DESCRIPTION OF THE INVENTION

The principal components of the overcoat used in the present invention are the fluoropolymer as the non-stick component and the ceramic particles having an average size of at least 10 micrometers as the abrasion resistant component. These components may also be present in the primer layer, along with sufficient adhesion promoter to obtain adhesion to the substrate being given the non-stick coating.

With respect to the fluoropolymer, the following description applies to the fluoropolymer present in the primer and in the overcoat, and topcoat. The fluoropolymer is a fluorocarbon resin. The fluoropolymer can be non melt-fabricable fluoropolymer with a melt creep viscosity of at least $1 \times 10^7$ Pa·s. One embodiment is polytetrafluoroethylene (PTFE) having a melt creep viscosity of at least $1 \times 10^7$ Pa·s at 380° C. with the highest heat stability among the fluoropolymer. Such non-melt-fabricable PTFE can also contain a small amount of comonomer modifier which improves film-forming capability during baking (fusing), such as perfluoroolefin, notably hexafluoropropylene (HFP) or perfluoro(alkyl vinyl) ether, notably wherein the alkyl group contains 1 to 5 carbon atoms, with perfluoro(propyl vinyl ether) (PPVE) being preferred. The amount of such modifier will be insufficient to confer melt-fabricability to the PTFE, generally being no more than 0.5 mole %. The PTFE, also for simplicity, can have a single melt creep viscosity, usually at least $1 \times 10^8$ Pa·s, but a mixture of PTFEs' having different melt viscosities can be used to form the non-stick component.

The fluoropolymer can also be melt-fabricable fluoropolymer, either combined (blended) with the PTFE, or in place thereof. Examples of such melt-fabricable fluoropolymers include copolymers of TFE and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3-6 carbon atoms and perfluoro(alkyl vinyl ethers) (PAVE) wherein the alkyl group contains 1-5 carbon atoms, especially 1-3 carbon atoms. Especially preferred comonomers include hexafluoropropylene (HFP), perfluoro(ethyl vinyl ether) (PEVE), perfluoro(propyl vinyl ether) (PPVE) and perfluoro(methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The molecular weight of the melt-fabricable tetrafluoroethylene copolymers is unimportant except that it is sufficient to be film-forming and be able to sustain a molded shape so as to have integrity in the undercoat application. Typically, the melt viscosity will be at least $1 \times 10^2$ Pa·s and may range up to about $60\text{-}100 \times 10^3$ Pa·s as determined at 372° C. according to ASTM D-1238.

A preferred composition is a blend of non melt-fabricable fluoropolymer having for example a melt creep viscosity in the range from $1 \times 10^7$ to $1 \times 10^{11}$ Pa·s and melt fabricable fluoropolymer having for example a viscosity in the range from $1 \times 10^3$ to $1 \times 10^5$ Pa·s.

The fluoropolymer is selected in the primer and overcoat layers and in the midcoat and topcoat layers so as to be sufficiently compatible with one another to accomplish intercoat adhesion upon baking when fluoropolymer is present in adjacent layers.

The fluoropolymer component is generally commercially available as a dispersion of the polymer in water, which is the preferred form for the primer, overcoat, midcoat, and, topcoat compositions used in the present invention for ease of application and environmental acceptability. By "dispersion" is meant that the fluoropolymer resin particles are colloidal in size and stably dispersed in the aqueous medium, so that settling of the particles does not occur within the time when the dispersion will be used. This is achieved by the small size of the fluoropolymer particles, typically on the order of less than 0.5 micrometers, and the use of surfactant in the aqueous dispersion by the dispersion manufacturer. Such dispersions can be obtained directly by the process known as aqueous dispersion polymerization, optionally followed by concentration and/or further addition of surfactant.

Another liquid form of the fluoropolymer to be used to form any of the layers described above is the dispersion of the fluoropolymer in an organic liquid. This is particularly useful when the fluoropolymer is PTFE micropowder, which is a low molecular weight PTFE that has melt-flowability. PTFE micropowder can be used in aqueous dispersion form as well. The aqueous dispersions of fluoropolymer described above can include miscible organic liquid.

With respect to the ceramic particle component, the ceramic from which the particles are made is one or more inorganic, non-metallic filler type materials that are inert with respect to the other components of the composition and thermally stable at its eventual baking temperature, which fuses the fluoropolymer. The ceramic particles are water insoluble so that they are typically uniformly dispersible but not dissolved in the aqueous or organic medium in which the fluoropolymer is dispersed. The ceramic particles preferably have an average particle size of no greater than about 50 micrometers. The preferred average particle size for the ceramic particles are about 14 to 36 micrometers and most preferably, about 20 to 30 micrometers. The ceramic particles having an average particle size of at least about 10 micrometers as disclosed herein can be described as large ceramic particles.

The ceramic particles preferably have a Knoop hardness of at least 1200 and more preferably of at least 1500. Knoop hardness is a scale for describing the resistance of a material to indentation or scratching. The large ceramic particles impart abrasion resistance to the non-stick coating used in present invention durability by deflecting abrasive forces applied to the coating surface.

The large ceramic particles typically have an aspect ratio of greater than 1.5, denoting some irregularity in shape, but preferably no greater than about 5:1 so as not to be plate-like. By aspect ratio is meant a ratio of the longest diameter or dimension (major axis or length) of a particle to the greatest distance of the minor dimension (height) measured perpendicular to the longest diameter of a particle as shown in FIG. 1 of U.S. Pat. No. 6,291,054. The aspect ratio is a means of quantifying a preferred particle shape and orientation.

Examples of inorganic filler film hardeners include inorganic oxides, carbides, borides and nitrides having a Knoop hardness of at least 1200. Preferred are inorganic oxides, nitrides, borides and carbides of zirconium, tantalum, titanium, tungsten, boron, aluminum and beryllium. Particularly preferred are silicon carbide and aluminum oxide. Typical Knoop hardness values for preferred inorganic compositions are: zirconia (1200); aluminum nitride (1225); beryllia (1300); zirconium nitride (1510); zirconium boride (1560); titanium nitride (1770); tantalum carbide (1800); tungsten carbide (1880); alumina (2025); zirconium carbide (2150); titanium carbide (2470); silicon carbide (2500); aluminum boride (2500); titanium boride (2850). It is thus apparent from the foregoing examples of the ceramic from which the large ceramic particles used in the present invention are made, that the ceramic is an inorganic compound, not a single element. The ceramic might also be considered as an oxide, nitride, boride, or carbide of a metal element. The large ceramic particle component of the composition used in the present invention can be particles of a single ceramic or a mixture of particles of different ceramics. The preferred large ceramic particle is SiC. Another preferred large ceramic particle is $Al_2O_3$.

In accordance with the present invention, the large ceramic particles are present in the overcoat and are also preferably present in the primer layer.

The amount of large ceramic particles present in the overcoat layer is that which is effective to increase the abrasion resistance of this layer preferably by at least 20% greater than the abrasion resistance of the layer, but without the presence of the large ceramic particles. More preferably, the large ceramic particles are present in an effective amount to increase the abrasion resistance by at least 50%, and even more preferably by at least 100% as compared to the layer without the large ceramic particles. The amount of fluoropolymer that is present in the overcoat layer is at least sufficient (effective) amount to provide a continuous film upon baking of the layer, wherein the fluoropolymer forms a matrix within which is dispersed the large ceramic particles. Significant improvement in abrasion resistance is obtained when the content of large ceramic particles is at least about 3 wt % based on the combined weight of the large ceramic particles and the fluoropolymer in the overcoat layer that contains both of these components, preferably about 3 to 40 wt % based on the combined weight of the large ceramic particles and fluoropolymer in the layer, the fluoropolymer content thereby being 96 to 60 wt %. This amount of fluoropolymer is sufficient to provide the film desired upon baking of the coating obtained from the composition. More preferably, the large ceramic particles constitute about 5-40 wt %, most preferably about 5 to 20 wt %, both based on the combined weight of these particles and the fluoropolymer in the layer that contains both of these components, the fluoropolymer content thereby being 95 to 60 wt %. These proportions of large ceramic particles and fluoropolymer apply to each of the particle sizes for the large ceramic particles disclosed above.

Additional components may be present in the overcoat layer of the non-stick coating used in the present invention. For example, the overcoat layer may contain small particle size inorganic film hardener, i.e. inorganic film hardener having an average particle size of less than 5 micrometers, preferably less than about 3 micrometers, and more preferably less than about 1 micrometer. The identity of the small particle size inorganic film hardener can be the same as for the large ceramic particles, except that the large and small particles do not have to have the same particle identity. The presence of the small particles of inorganic film hardener tends not to increase the abrasion resistance of the non-stick coating obtained from the composition used in the present invention, but does increase the hardness of the coating and thereby its durability against scratching. Thus, the overcoat layer used in the present invention can contain 0 to about 30 wt % of the small particles of inorganic film hardener. Preferably about 5 to 30 wt % of these small particles are present, based on the combined weight of large ceramic particles, fluoropolymer, and small particles of inorganic film hardener in a single layer, more preferably about 8 to 20 wt %.

The overcoat layer used in the present invention preferably contains no, i.e. is free of, adhesion promoter. An adhesion promoter is a material normally present in the primer layer to adhere the primer layer to the uncoated substrate, such as of metal, glass or ceramic material. The fluoropolymer, because of its non-stick property does not adhere to the uncoated substrate and thus does not perform the adhesion promoter function. The fluoropolymer present in the overcoat layer is also not an adhesion promoter, notwithstanding that this fluoropolymer will adhere this layer to an adjacent layer that contains fluoropolymer during the baking process, i.e. to provide intercoat adhesion. A small amount of adhesion promoter can be present in the overcoat composition used in the present invention, however, to obtain intercoat adhesion when the layer onto which the overcoat composition is coated does not contain fluoropolymer. Since the presence of adhesion promoter in the layer formed from such composition tends (a) to detract from the non-stick property of the exposed surface of such layer and (b) increases the difficulty in the spray application of the composition in the form of an aqueous dispersion, the amount of adhesion promoter should be as small as possible. Preferably, the amount of adhesion promoter present in the composition, if present, is no greater than about 8 wt %, more preferably no greater than about 5 wt %, based on the weight of the fluoropolymer in the overcoat layer. The composition can also be substantially free of adhesion promoter, i.e. containing less than 2 wt %, preferably less than 1.5 wt %, and more preferably less than 1 wt % adhesion promoter, these weights being based on the weight of the fluoropolymer in the composition.

The adhesion promoter is generally does not contain fluorine. Typical adhesion promoters are those used in primer layers, such as colloidal silica and/or thermally stable polymers, typically called polymer binders. While the polymer binder is generally non-fluorine containing, it adheres to the fluoropolymer as well as the substrate to which the primer is applied. In the present case, the adhesion promoter promotes intercoat adhesion, especially when the primer, while containing polymer binder, contains no fluoropolymer. Preferred polymer binders are those that are soluble or solubilized in water or a mixture of water and organic solvent for the binder, which solvent is miscible with water. This solubility aids in the blending of the binder with the fluoropolymer component in the aqueous dispersion form.

An example of the binder component is polyamic acid salt, which converts to polyamideimide (PAI) upon baking of the composition. This binder is preferred because in the fully imidized form obtained by baking the polyamic acid salt, this binder has a continuous service temperature in excess of 250° C. The polyamic acid salt is generally available as polyamic acid having an inherent viscosity of at least 0.1 as measured as a 0.5 wt % solution in N,N-dimethylacetamide at 30° C. It is dissolved in a coalescing agent such as N-methylpyrrolidone, and a viscosity-reducing agent, such a furfuryl alcohol and reacted with tertiary amine, preferably triethylamine, to form the salt, which is soluble in water, as described in greater detail in U.S. Pat. No. 4,014,834 (Concannon). The resultant reaction medium containing the polyamic acid salt can then be blended with the fluoropolymer aqueous dispersion, and because the coalescing agent and viscosity-reducing agent are miscible in water, the blending produces a uniform coating composition. The blending can be achieved by simple mixing of the liquids together without using excess agitation so as to avoid coagulation of the fluoropolymer aqueous dispersion. Examples of other binders suitable for use with the present invention include polyamideimide (PAI), polyimide (PI), polyphenylene sulfide (PPS), polyether sulfone (PES), polyarylene-etherketone, polyetherimide, and poly(1,4(2,6-dimethylephenyl) oxide) commonly known as polyphenylene oxide (PPO). All of these resins are thermally stable at a temperature of at least 140° C. Polyethersulfone is an amorphous polymer having a sustained use temperature (thermal stability) of up to 190° C. and glass transition temperature of 220° C. Polyamideimide is thermally stable at temperatures of at least 250° C. and melts at temperatures of at least 290° C. Polyphenylene sulfide melts at 285° C. Polyaryleneetherketones are thermally stable at temperatures of at least 250° C. and melt at temperatures of at least 300° C.

For simplicity, only one polymer binder may be used to form the adhesion promoter component, if present, of the overcoat layer. However, multiple polymer binders are also contemplated for use in this invention. This is particularly true for the use of polymer binder in the primer layer. Preferred polymer binders are at least one polymer selected from the group consisting of PAI, PES, and PPS. This preference applies the polymer binder used in the primer and in the overcoat, if adhesion promoter is present in the overcoat.

The non-stick coating of the present invention may contain other filler materials having a Knoop hardness value of less than 1200 in one or more layers making up the non-stick coating. Suitable additional fillers include glass flake, glass bead, glass fiber, aluminum or zirconium silicate, mica, metal flake, metal fiber, fine ceramic powders, silicon dioxide, barium sulfate, talc, etc. that might be used in the primer, overcoat and/or topcoat layers. The non-stick coating may also contain pigment, the amount of which will depend on the color desired and the particular pigment being used.

Each of the layers of the non-stick coating of the present invention can be applied sequentially to the substrate by conventional means, preferably in the form of a liquid medium, and more preferably wherein the liquid of the medium comprises water and the composition being applied to the substrate is an aqueous dispersion. The primer can be any of the primers disclosed in the prior art, typically containing adhesion promoter, such as described above and fluoropolymer as the essential ingredients. Multiple polymer binders can be used in the primer, especially when certain end-use properties are desired, such as flexibility, hardness, or corrosion protection. Common combinations include PAI/PES, PAI/PPS and PES/PPS. The adhesion promoter in the primer may also include a combination of different adhesion promoters, e.g. colloidal silica and polymer binder.

The primer contains adhesion promoter and the adhesion promoters described above as possibly being used in the overcoat can be used in the primer. The preferred adhesion promoters used in the primer include at least one of PAI, PES, and PPS. The primer may or may not, however, contain large ceramic particles and may exclude fluoropolymer. When large ceramic particles (average size of at least 10 micrometers) are used in the primer layer, they are present in an effective amount to increase the abrasion resistance (dry SBAR) of the non-stick coating wherein the overcoat also contains the large ceramic particles. Typically, this will require the presence of at least 3 wt % of the large ceramic particles in the primer layer, based on the total weight of the primer layer (dry solids basis). The primer layer may also contain up to 60 wt % of the large ceramic particles, based on the weight of the primer layer (dry solids basis). The primer layer may also contain inorganic film hardener having an average particle size of less than 5 micrometers as described above. The use of a fluoropolymer in the primer layer is preferred, but is not necessary for the practice of the present invention. Thus, the primer can be substantially free of fluoropolymer, i.e. will contain less than 10 wt % of fluoropolymer, preferably less than 5 wt % of fluoropolymer, based on the weight of solids in the primer layer composition. The reference to solids weights herein refers to weight after baking.

Generally, the fluoropolymer will comprise 10-45 wt % of the primer layer, when present in the primer layer, at least 70 wt. % of the midcoat layer, and at least 90 wt % of the overcoat layer. All of these weight percentages are based on solids.

Spray and roller applications forming each layer are the most convenient application methods, depending on the substrate being coated with primer. Other well-known coating methods including dipping and coil coating are suitable. The overcoat can be applied by conventional methods onto the primer layer prior to its drying. However, when the primer and overcoat compositions are aqueous dispersions, the overcoat composition can be applied to the primer layer preferably after drying to touch. The same is true for application of the topcoat layer to the overcoat, which than becomes the midcoat layer of the non-stick finish. The topcoat composition can be any of the published topcoat fluoropolymer compositions. When the primer layer is made by applying the primer composition from an organic solvent, and the overcoat layer is applied from an aqueous medium, the primer layer should be dried so that all water-incompatible solvent is removed before application of the overcoat. The adhesion properties of the primer to the substrate and intercoat adhesion will manifest themselves upon drying and baking of the overcoat layer together with the drying and baking of the primer (presence mandatory) and topcoat (optionally present) to form the non-stick finish on the substrate.

The resultant composite layered structure can be baked to fuse all the coatings at the same time to form a non-stick finish on the substrate. When the fluoropolymer is PTFE, a quick high bake temperature is preferred, e.g., for 5 min. at a temperature starting at 800° F. (427° C.) and rising to 815° F. (435° C.). When the fluoropolymer in the primer or the overcoat is a blend of PTFE and FEP, e.g., 50-70 wt % PTFE and 50-30 wt % FEP, the bake temperature may be reduced to 780° F. (415° C.), rising to 800° F. (427° C.) in 3 minutes (total bake time).

The resultant coated substrate preferably has a primer layer that is no greater than 0.6 mils (16 micrometers) thick, more preferably 0.3 to 0.5 mils (8-13 micrometers) thick. Preferably the midcoat layer is thicker than the primer layer and is more preferably at least 50% thicker. Preferably the midcoat layer is 0.6 to 0.9 mils (15-23 micrometers) and the topcoat layer is 0.2 to 0.5 mils (5-12 micrometers) thick. The thickness of the layers that contain large ceramic particles is measured by the eddy-current principle (ASTM B244) after baking. The eddy current values reflect an average of values across the substrate including the height of large particle and the depth of the valleys between particles. This method is further described under Test Methods as applied to the building-up of the layers of coating on a substrate in the formation of the non-stick coating. The primer layer thickness can also be measured on the baked non-stick coating by sectioning the coated substrate, e.g. frying pan, and measuring the thickness from a micrograph obtained from a scanning electron microscope (SEM). By using SEM, a distinction can be made between the height of the large particles and the depth of the valley between particles. SEM values that report the primer thickness in the valley between particles are about 50% of reported eddy current values.

The substrate used in the present invention can be a metal or ceramic, examples of which include aluminum, anodized aluminum, cold-rolled steel, stainless steel, enamel, glass, and pyroceram. These materials may form the entire substrate or in the case of composite materials, just the surface of the substrate. The substrate can be smooth, i.e. having a surface profile of less than 50 microinches (1.25 micrometers) as measured by a model RT 60 surface tester made by Alpa Co. of Milan, Italy, and needs to be clean. For pyroceram and some glass, improved results are obtained by activation of the substrate surface such as by a slight chemical etch, which is not visible to the naked eye, i.e., the surface is still smooth. The substrate can also be chemically treated with an adhesion agent such as a mist coat of polyamic acid salt, such as disclosed in U.S. Pat. No. 5,079,073 to Tannenbaum.

Products having non-stick finishes of the present invention include cookware, bakeware, rice cookers and inserts therefor, water pots, iron sole plates, conveyors, chutes, roll surfaces, cutting blades, etc.

Test Methods

Dry SBAR Test:

A non-stick-coated substrate is evaluated for abrasion resistance of the non-stick coatings using the SBAR test. This test is based on the British Standard Specification for cookware BS 7069: 1988 in which the coating system is subjected to an abrasive pad attached on a vertical arm with reciprocal horizontal movement. The apparatus performs an arm reciprocal horizontal movement of 100 mm±5 mm (4 in.+/−0.25 in.) from cylinder center at an average speed of ±10 m/min. The abrasive pad (3M Scotch-Brite 7447) is a random nylon web impregnated with phenolic resin and aluminum oxide is secured to the cylinder and loaded to apply a total force of ±15 N (mass of arm+dead weight=4.5 kg or 10 lbs) on the coating. The test sample is prepared by coating a substrate as explained in the Examples with drying and baking as specified.

The coated substrate is tested as prepared, without washing. The coated substrate is fixed on a fixed support and the loaded abrasive pad is applied on the non-stick surface. The specimen is kept stationary and the abrasive pad arm is moved backwards and forwards over a distance of 50 mm±2.5 mm (2 in +/−0.1 in) on both sides of the cylinder center point.

The abrasive pad is turned after 250 cycles and renewed after another 250 cycles. This procedure is continued until metal is visible and then the number of cycles for coating breakthrough is recorded. Coating breakthrough is the final point of the test.

Release Test

The non-stick-coated pan is heated to a range of from 374° F. (190° C.) to 392° F. (200° C.) and maintained in this temperature range as measured by a contact pyrometer on the substrate surface throughout the testing. An egg is fried in an unseasoned pan. To conduct the test an egg is broken over the pan and cooked for 3 minutes. The egg is lifted with a spatula and the pan is tilted to allow for the egg to slide. The ease with which the egg slides is assessed. The pan is returned to the burner and the egg is turned over. The yolk of the egg is broken with a spatula and the egg is cooked for 2 more minutes. The egg is again lifted with a spatula and the ease with which the spatula removes the egg from the non-stick coating is release rating for the coating. This release test is repeated after each 7500 cycles of the SBAR test performed on the non-stick coating. For all of the non-stick coatings of the following Examples, including the Comparative coatings, the egg was easily removed from the non-stick surface by the spatula through the life of the coating in the SBAR test, up to the time of the metal of the substrate first becoming visible. The exception to this observation is the non-stick coating of Example 12 in Table 8, wherein the release started to deteriorate at 45000 cycles.

Dried Film Thickness (DFT)

The baked coating thickness is measured with a film thickness instrument, e.g., Fisherscope, based on the eddy-current principle (ASTM B244). Because of the presence of large particles in the coatings, the thickness determination is done on coupons placed in the pan. To prepare the coupons one coupon is attached to the metal pan and two adjacent spots are taped prior to any application of the coating. The primer is applied as specified in the examples and one tape is removed to expose bare metal over which a second coupon is placed. The midcoat is subsequently applied and the second tape is removed to expose over which a third coupon is applied. Measurement of the first coupon provides total thickness of all three coatings—primer, midcoat and topcoat. Measurement of the second coupon provides thickness of the midcoat and topcoat. Measurement of third coupon provides thickness of the topcoat. Individual values for primer thickness and midcoat thickness are calculated by subtraction. Primer thickness is determined by subtracting the value of the thickness of the second coupon from the first coupon. Midcoat thickness is determined by subtracting the thickness of the third coupon from the second coupon.

Fluoropolymer

PTFE dispersion: DuPont TFE fluoropolymer dispersion with a solids content of from 59-61 wt % and RDPS of from 170-210 nanometers. PTFE fluoropolymer dispersion grade 30, is available from the DuPont Company, Wilmington, Del.

FEP dispersion: TFE/HFP fluoropolymer dispersion with a solids content of from 54.5-56.5 wt % and RDPS of from 150-210 nanometers, the resin having an HFP content of from 9.3-12.4 wt % and a melt flow rate of 11.8-21.3 g/10 min measured at 372° C. by the method of ASTM D-1238 modified as described in U.S. Pat. No. 4,380,618. PFA dispersion: DuPont PFA fluoropolymer dispersion with a solids content of from 58-62 wt % and RDPS of from 185-245 nanometers, the resin having an PPVE content of from 2.9-3.6 wt % and a melt flow rate of 1.3-2.7 g/10 min measured at 372° C. by the method of ASTM D-1238 modified as described in U.S. Pat. No. 4,380,618. PFA fluoropolymer dispersion grade 335, is available from the DuPont Company, Wilmington, Del.

Polymer Binder

PAI is Torlon® AI-10 poly(amide-imide) (Solvay Advanced polymers), a solid resin (which can be reverted to polyamic salt) containing 6-8% of residual NMP.

Polyamic acid salt is generally available as polyamic acid having an inherent viscosity of at least 0.1 as measured as a 0.5 wt % solution in N,N-dimethylacetamide at 30° C. It is dissolved in a coalescing agent such as N-methyl pyrrolidone, and a viscosity reducing agent, such as furfuryl alcohol and reacted with tertiary amine, preferably triethyl amine to form the salt which is soluble in water, as described in greater detail in U.S. Pat. No. 4,014,834 (Concannon).

Silicon Carbide

Silicon carbide supplied by Elektroschmelzwerk Kempten GmbH (ESK), Munich Germany is used.

P 1200=15.3±1 micrometers average particle size

P 600=25.8±1 micrometers average particle size

P 400=35.0±1.5 micrometers average particle size

P 320=46.2±1.5 micrometers average particle size

F1000-D=5–7 micrometers average particle size

The average particle size is measured by sedimentation using FEPA-Standard-43-GB 1984R 1993 resp. ISO 8486 according to information provided by the supplier.

Aluminum Oxide

Aluminum oxide (small particles) are supplied by Aluminum Corporation of America—Grade SG A-16 with an average particle size 0.35-0.50 micrometers.

EXAMPLES

A 3-coat non-stick system representative of the invention is sprayed onto test pans of smooth aluminum that have been treated only by washing to remove grease but not mechanically roughened. The aqueous dispersion compositions of the primer, midcoat and topcoat are listed in Tables 1, 2, 3 and 4 respectively.

TABLE 1

Primer Compositions A, B, and C

| | wt % | | | | | |
|---|---|---|---|---|---|---|
| | Primer A | | Primer B | | Primer C | |
| Ingredients | Wet Primer A | Dry | Wet Primer B | Dry | Wet Primer C | Dry |
| COLLOIDAL SILICA | 0.95 | 3.43 | 1.08 | 5.23 | 0.83 | 4.11 |
| POLYAMIDE-IMIDE POLYMER | 4.65 | 16.83 | 5.12 | 24.82 | 5.55 | 27.45 |
| SODIUM POLYNAPTHALENE SULFONATE | 0.19 | .68 | 0.00 | 0.00 | 0.16 | 0.81 |
| PTFE | 4.19 | 15.19 | 4.78 | 23.18 | 0.00 | 0.00 |
| PFA | 2.07 | 7.51 | 2.36 | 11.46 | 0.00 | 0.00 |
| NONIONIC SURFACTANT | 0.96 | 0.00 | 0.67 | 0.00 | 0.14 | 0.00 |
| MICA | 0.00 | 0.00 | 0.05 | .24 | 0.00 | 0.00 |
| METHYL PYRROLIDONE | 2.78 | 0.00 | 3.07 | 0.00 | 3.33 | 0.00 |
| CARBON BLACK | 0.31 | 1.13 | 0.00 | 0.00 | 0.27 | 1.32 |
| ULTRAMARINE BLUE PIGMENT | 1.76 | 6.38 | 7.22 | 35.02 | 1.55 | 7.65 |
| ALUMINUM OXIDE | 8.15 | 29.54 | 0.00 | 0.00 | 7.08 | 35.02 |
| ZINC OXIDE | 0.00 | 0.01 | 0.01 | 0.04 | 0.00 | 0.01 |
| SiC, P600 | 5.33 | 19.30 | 0.00 | 0.00 | 2.39 | 11.82 |
| SiC, P400 | 0.00 | 0.00 | 0.00 | 0.00 | 2.39 | 11.82 |
| HYDROXYPROPYL CELLULOSE | 0.02 | 0.00 | 0.00 | 0.00 | 0.02 | 0.00 |
| 2,4,7,9-TETRAMETHYL-5 DECYNE-4,7,DIOL | 0.24 | 0.00 | 0.00 | 0.00 | 0.21 | 0.00 |
| WATER | 63.09 | 0.00 | 69.47 | 0.00 | 69.97 | 0.00 |
| TRIETHANOLAMINE | 0.01 | 0.00 | 0.00 | 0.00 | 0.01 | 0.00 |
| FURFURYL ALCOHOL | 3.58 | 0.00 | 4.01 | 0.00 | 3.76 | 0.00 |
| DIETHYLAMINOETHANOL | 0.66 | 0.00 | 0.72 | 0.00 | 0.78 | 0.00 |
| TRIETHYLAMINE | 1.31 | 0.00 | 1.44 | 0.00 | 1.57 | 0.00 |
| Total | 100.0 | 100.0 | 100.0 | 100.0 | 100.0 | 100.0 |

Primer A has both fluoropolymer and SiC. Primer B has fluoropolymer, but no SiC. Primer C has SiC but no fluoropolymer.

TABLE 2

Midcoat Compositions A, B

| | wt % | | | |
|---|---|---|---|---|
| | Midcoat A | | Midcoat B | |
| Ingredients | Wet Midcoat A | Dry | Wet Midcoat B | Dry |
| PAI | 0.00 | 0.00 | 0.53 | 1.39 |
| SODIUM POLYNAPTHALENE SULFONATE | 0.22 | 0.51 | 0.09 | .24 |
| ACRYLIC POLYMER | 5.13 | 0.00 | 4.75 | 0.00 |
| PFA | 5.01 | 11.73 | 4.51 | 11.85 |
| PTFE | 28.39 | 66.46 | 25.55 | 67.10 |
| OLEIC ACID | 1.02 | 0.00 | 1.13 | 0.00 |
| MICA/TIO2/TIN OXIDE | 0.73 | 1.72 | 0.66 | 1.74 |
| DIETHYLENE GLYCOL MONOBUTYL ETHER | 2.03 | 0.00 | 2.23 | 0.00 |
| AROMATIC HYDROCARBON | 2.48 | 0.00 | 2.73 | 0.00 |
| CARBON BLACK | 1.05 | 2.45 | 1.14 | 2.98 |

TABLE 2-continued

Midcoat Compositions A, B

| | wt % | | | |
|---|---|---|---|---|
| | Midcoat A | | Midcoat B | |
| Ingredients | Wet Midcoat A | Dry | Wet Midcoat B | Dry |
| ULTRAMARINE BLUE PIGMENT | 0.28 | 0.65 | 0.50 | 1.32 |
| ALUMINUM OXIDE | 6.56 | 15.36 | 0.00 | 0.00 |
| SiC | 0.00 | 0.00 | 4.56 | 11.97 |
| CERIUM OCTOATE | 0.48 | 1.12 | 0.54 | 1.41 |
| HYDROXYPROPYL CELLULOSE | 0.02 | 0.00 | 0.00 | 0.00 |
| NONIONC SURFACTANT | 3.74 | 0.00 | 4.02 | 0.00 |
| WATER | 38.97 | 0.00 | 41.94 | 0.00 |
| TRIETHANOLAMINE | 3.90 | 0.00 | 4.27 | 0.00 |
| DIETHYLAMINOETHANOL | 0.00 | 0.00 | 0.08 | 0.00 |
| METHYL PYRROLIDONE | 0.00 | 0.00 | 0.30 | 0.00 |
| FURFURYL ALCOHOL | 0.00 | 0.00 | 0.37 | 0.00 |
| TRIETHYLAMINE | 0.00 | 0.00 | 0.15 | 0.00 |
| Total | 100.0 | 100.0 | 100.0 | 100.0 |

Midcoat A contains no SiC, and Midcoat B contains SiC.

TABLE 3

Midcoat Compositions C-J

| | Midcoat C | Midcoat D | Midcoat E | Midcoat F | Midcoat G | Midcoat H | Midcoat I | Midcoat J |
|---|---|---|---|---|---|---|---|---|
| Type SiC | F1000-D (5-7 μm) | P600 (25.8) | P320 (46.2) | P1200 (15.3) | P600 (25.8) | P600 (25.8) | P600 (25.8) | P600 (25.8) |

| | Wt % | | | | | | | |
|---|---|---|---|---|---|---|---|---|
| Ingredients | Wet | Wet | Wet | Wet | Wet | Wet | Wet | Wet |
| SiC | 5.50 | 5.50 | 5.50 | 5.50 | 1.74 | 15.40 | 3.55 | 5.43 |
| Midcoat A | 94.50 | 94.50 | 94.50 | 94.50 | 98.26 | 84.60 | 96.45 | 94.57 |

Midcoats C, D, E, F, and J contain about the same amount of SiC, but of different average particle size. Midcoats G, H, and I contain the same average particle size SiC but in different amounts.

TABLE 4

Topcoat Composition

| | Wt % Primer | |
|---|---|---|
| Ingredients | Wet | Dry |
| ACRYLIC POLYMER | 5.17 | 0.00 |
| PFA | 2.09 | 4.89 |
| PTFE | 39.68 | 92.91 |
| OLEIC ACID | 1.21 | |
| MICA/TIO2/TIN OXIDE | 0.37 | 0.87 |

TABLE 4-continued

Topcoat Composition

| | Wt % Primer | |
|---|---|---|
| Ingredients | Wet | Dry |
| DIETHYLENE GLYCOL MONOBUTYL ETHER | 2.41 | |
| AROMATIC HYDROCARBON | 2.95 | |
| CERIUM OCTOATE | 0.57 | 1.33 |
| NONIONIC SURFACTANT | 4.69 | |
| WATER | 36.29 | |
| TRIETHANOLAMINE | 4.58 | |
| Total | 100.0 | 100.0 |

The primer is sprayed onto the aluminum substrate and dried at 150° F. (66° C.) for 10 minutes. The midcoat is then sprayed over the dried primer. The topcoat is applied (sprayed) wet on wet to the midcoat. The coating is forced drying at 300° F. (149° C.) for 10 minutes and then cured at 800° F. (427° C.) for 5 minutes. The dried coating film thickness (DFT) for primer/midcoat/topcoat is determined by coupons using the eddy current analysis as described above. In general the thicknesses are primer 0.31-0.55 mils (7.8-13.8 micrometers)/midcoat 0.62-0.82 mils (15.5-20.5 micrometers)/topcoat 0.2-0.48 mils (5-12 micrometers).

The Examples presented in the tables below show an abrasion resistance of the 3-coat system with varying amounts and sizes of SiC particles in the midcoat of the coating system. Non-stick-coated test pans are subjected to dry SBAR testing to evaluate abrasion resistance.

SiC Particles in the Midcoat—% Loading

Abrasion test results of a 3-coat system with SiC particles in the midcoat are shown in Table 5. The SiC particle size is maintained at 25.8 micrometers while the % weight is varied. Great improvement in dry SBAR results is seen even with small amounts if SiC and increases with higher loading of SiC particles. No SiC particles are present in the primer used (Primer B).

TABLE 5

Performance based on SiC Loading in Midcoat

| | Comp 1 | Example 1 | 2 | 3 | 4 |
|---|---|---|---|---|---|
| Dry SBAR K cycle avg. | 1.1 | 26.5 | 35.8 | 31.0 | 43.8 |
| % dry SBAR improvement vs. comp 1 | — | 2260 | 3080 | 2660 | 3790 |
| Primer | B | B | B | B | B |
| Primer SiC wt % | 0.00 | 0.00 | 0.00 | 0.00 | 0.00 |
| Primer SiC particle size (microns) | — | — | — | — | — |
| Midcoat | A | G | I | D | H |
| Midcoat SiC wt % (Dry) Total Solids | 0.00 | 3.98 | 7.93 | 11.99 | 29.88 |
| Midcoat SiC particle size (microns) | — | 25.8 | 25.8 | 25.8 | 25.8 |
| Midcoat Fluoropolymer wt % (Dry) | 78.19 | 75.08 | 71.99 | 68.81 | 54.83 |
| Midcoat SiC/SiC plus Fluoropolymer wt % (Dry) | — | 5.03 | 9.92 | 14.84 | 35.27 |

SiC Particles in the Midcoat—Particle Size Effect

Abrasion test results of a 3-coat system with SiC particles in the midcoat are shown in Tables 6 and 7. The SiC particle size in midcoat is varied in the range of from 5-7 micrometers to 46 micrometers at the loading ratio of about 12 wt % in the dry film. In Table 6, the samples also have SiC particles in the primer, those particles having a particle size of 25.8 micrometers. In Table 7, the samples have no SiC particles in the primer. The results show increased dry SBAR results of all samples having a particle above 14 micrometers in the midcoat, with surprisingly superior results for samples containing SiC particles in the range of 20-30 micrometers in the midcoat. Comparison of Comparative Example 2, wherein the primer contains 19.30 wt % SiC, with Example 1 of Table 5, wherein no SiC particles are present in the primer and only 3.98 wt % SiC is present in the midcoat reveals the much greater effectiveness of the presence of the large SiC particles in the midcoat than in the primer. The coating of Example 1 exhibits more than 40% improvement in SBAR abrasion resistance over that of Comparative Example 2 with less than 25% of the amount of SiC used in the primer of Comparative Example 2.

Calculation of % improvement: $((29.0-18.4) \div 18.4) \times 100$

TABLE 7

Performance based on SiC particle size in Midcoat, without SiC in Primer

| | Comp 1 | Example 8 | 9 | 10 |
|---|---|---|---|---|
| Dry SBAR K cycle ave | 1.1 | 15.5 | 31.0 | 22.5 |
| % dry SBAR improvement vs. comp 1 | — | 1280 | 2660 | 1900 |
| Primer | B | B | B | B |
| Primer SiC wt % | 0.00 | 0.00 | 0.00 | 0.00 |
| Primer SiC particle size (microns) | — | — | — | — |
| Midcoat | A | F | D | E |
| Midcoat SiC wt % Total Solids | 0.00 | 11.99 | 11.99 | 11.99 |
| Midcoat SiC particle size (microns) | — | 15.3 | 25.8 | 46.2 |
| Midcoat Fluoropolymer wt % (Dry) | 78.19 | 68.81 | 68.81 | 68.81 |
| Midcoat SiC/SiC plus Fluoropolymer wt % (Dry) | — | 14.84 | 14.84 | 14.84 |

TABLE 6

Performance based on SiC particle size in Midcoat, with SiC in Primer

| | Comp 2 | Comp 3 | Example 5 | 6 | 7 |
|---|---|---|---|---|---|
| Dry SBAR K cycle avg. | 18.4 | 20.8 | 29.0 | 42.0 | 38.0 |
| % dry SBAR improvement vs. comp 2* | — | 13 | 57 | 128 | 106 |
| Primer | A | A | A | A | A |
| Primer SiC wt % (Dry) | 19.30 | 19.30 | 19.30 | 19.30 | 19.30 |
| Primer SiC particle size (microns) | 25.8 | 25.8 | 25.8 | 25.8 | 25.8 |
| Primer Fluoropolymer wt % (Dry) | 22.70 | 22.70 | 22.70 | 22.70 | 22.70 |
| Midcoat | A | C | F | J | E |
| Midcoat SiC wt % (Dry) Total Solids | 0.00 | 11.99 | 11.99 | 11.85 | 11.99 |
| Midcoat SiC particle size (microns) | — | 5-7 | 15.3 | 25.8 | 46.2 |
| Midcoat Fluoropolymer wt % (Dry) | 78.19 | 68.81 | 68.81 | 68.93 | 68.81 |
| Midcoat SiC/SiC plus Fluoropolymer wt % (Dry) | — | 14.84 | 14.84 | 14.67 | 14.84 |

Comparison of System With and Without Fluoropolymer in Primer

Abrasion test results of a 3-coat system with primers A (fluoropolymer) and C (no fluoropolymer), both coated with midcoat B (13.2 wt % SiC based on combined weight of SiC and fluoropolymer) are shown in Table 8. The SiC average particle size in the midcoat is 25.8 micrometers.

TABLE 8

Primer Layer With/Without Fluoropolymer

| | Example | |
|---|---|---|
| | 11 | 12 |
| Dry SBAR K cycle avg. | 49.8 | >50 |
| Primer | A | C |
| Primer SiC wt % (Dry) | 19.30 | 11.82/11.82 |
| Primer SiC particle size (microns) | 25.8 | 25.8/35.0 |
| Primer Fluoropolymer wt % (Dry) | 22.70 | 0.00 |
| Midcoat | B | B |
| Midcoat SiC wt % (Dry) Total Solids | 11.97 | 11.97 |
| Midcoat SiC particle size (microns) | 25.8 | 25.8 |
| Midcoat Fluoropolymer wt % (Dry) | 78.95 | 78.95 |
| Midcoat SiC/SiC plus Fluoropolymer wt % (Dry) | 13.17 | 13.17 |

In another Example of the present invention, a primer having no fluoropolymer is used in combination with a midcoat that has no adhesion promoter. The primer is similar to primer C, except that the SiC is entirely P600, i.e. making up 25.2 wt % of the dry weight of the primer composition. The midcoat is similar to midcoat D, except that the amount of SiC is 11.7 wt % based on the dry weight of the composition. As in the case of midcoat D, the midcoat composition used in this Example has no PAI adhesion promoter. The topcoat is the same composition as in Table 4. The primer, midcoat, and topcoat compositions are sequentially applied to a substrate (aluminum frying pan) in the same manner as set forth above to form a non-stick coating on the substrate. The coating thicknesses (dry) are 0.45 mil (11.3 micrometers) for the primer layer, 0.76 mil (19 micrometers) for the midcoat layer, and 0.37 mil (9.3 micrometers) for the topcoat layer. The SBAR test result on this coating is 39,000 cycles.

The invention claimed is:

1. A substrate having non-stick coating thereon comprising an overcoat and a primer adhering said overcoat to said substrate, said overcoat comprising fluoropolymer and an effective amount of ceramic particles having an average particle size of at least about 10 micrometers to increase the abrasion resistance of said coating as determined by the dry SBAR method by at least 50%.

2. The substrate of claim 1 wherein said amount of said ceramic particles is at least about 3 wt % based on the combined weight of said ceramic particles and said fluoropolymer in said overcoat.

3. The substrate of claim 1 wherein said primer also contains ceramic particles having an average size of at least about 10 micrometers.

4. The substrate of claim 1 wherein said primer comprises fluorine-free adhesion promoter and optionally, fluoropolymer.

5. The substrate of claim 4 wherein said adhesion promoter is selected from the group consisting of polyamideimide, polyether sulfone, and polyphenylene sulfide.

6. The substrate of claim 1 wherein said primer is substantially free of fluoropolymer.

7. The substrate of claim 1 wherein said non-stick coating includes a topcoat which comprises fluoropolymer and is free of said ceramic particles.

8. The substrate of claim 7 wherein said overcoat has a thickness which is less than the major dimension of said ceramic particles.

9. The substrate of claim 3 wherein said non-stick coating includes a topcoat which comprises fluoropolymer and is free of said ceramic particles.

10. The substrate of claim 1 wherein additionally inorganic film hardener is present in at least one of said primer and said overcoat, said inorganic film hardener having an average particle size of less than about 5 micrometers.

11. The substrate of claim 1 wherein the thickness of said overcoat is about 0.5 to 1 mil (12.7 to 25.4 micrometers).

12. The substrate of claim 1 wherein said ceramic particles have an average particle size of about 14 to 36 micrometers.

13. The substrate of claim 1 wherein said overcoat contains adhesion promoter in an amount of up to about 10 wt % based on the weight of said fluoropolymer.

14. The substrate of claim 1 wherein said primer and overcoat are sequentially applied to said substrate and said fluoropolymer and said ceramic particles are present in said overcoat prior to its being sequentially applied to said substrate.

15. The substrate of claim 13 wherein said adhesion promoter is selected from the group consisting of polyamideimide, polyether sulfone, and polyphenylene sulfide.

16. The substrate of claim 1 wherein said overcoat is substantially free of adhesion promoter.

17. The substrate of claim 1 wherein said primer and overcoat are sequentially applied to said substrate from a liquid medium.

18. The substrate of claim 1 wherein said substrate is cookware, bakeware, rice cooker, and inserts therefor, water pot, iron sole plate, conveyor, chute, roll surface or cutting blade.

19. The substrate of claim 1 wherein said ceramic particles have a Knoop hardness of at least 1200.

20. The substrate of claim 13 wherein said primer is free of said ceramic particles.

* * * * *